United States Patent [19]
Usuda et al.

[11] Patent Number: 5,658,682
[45] Date of Patent: Aug. 19, 1997

[54] PROCESS FOR DETECTING REMAINING CAPACITY OF BATTERY

[75] Inventors: Masafumi Usuda; Morio Kayano, both of Saitama-ken, Japan

[73] Assignee: Honda Giken Kogyo Kabushiki Kaisha, Tokyo, Japan

[21] Appl. No.: 603,542

[22] Filed: Feb. 20, 1996

Related U.S. Application Data

[63] Continuation of Ser. No. 514,170, Aug. 11, 1995, abandoned, which is a continuation of Ser. No. 165,232, Dec. 10, 1993, abandoned.

[30] Foreign Application Priority Data

Dec. 11, 1992 [JP] Japan .................. 4-331434

[51] Int. Cl.$^6$ ................................. H01M 10/48
[52] U.S. Cl. .................. 429/92; 429/90; 429/93; 524/431
[58] Field of Search ............ 429/90-94; 324/427, 324/431

[56] References Cited

U.S. PATENT DOCUMENTS

| | | | |
|---|---|---|---|
| 4,289,836 | 9/1981 | Lemelson | 429/61 |
| 4,304,823 | 12/1981 | Lemelson | 429/19 |
| 4,390,841 | 6/1983 | Martin et al. | 429/934 |
| 5,284,719 | 2/1994 | Landau et al. | 429/50 |

*Primary Examiner*—M. Nuzzolillo
*Attorney, Agent, or Firm*—Lyon & Lyon LLP

[57] ABSTRACT

A maximum output power and a discharged electric power amount from the battery is calculated; a future variation in maximum output power relative to the discharged electric power amount is evaluated, thereby determining a remaining capacity of the battery on the basis of the electric power amount discharged until the maximum output power reaches a preset lowest maximum-output power. Thus, the remaining capacity of the battery can be correctly detected, irrespective of the charged state, the discharge rate, the degree of deterioration of the battery and the like.

17 Claims, 11 Drawing Sheets

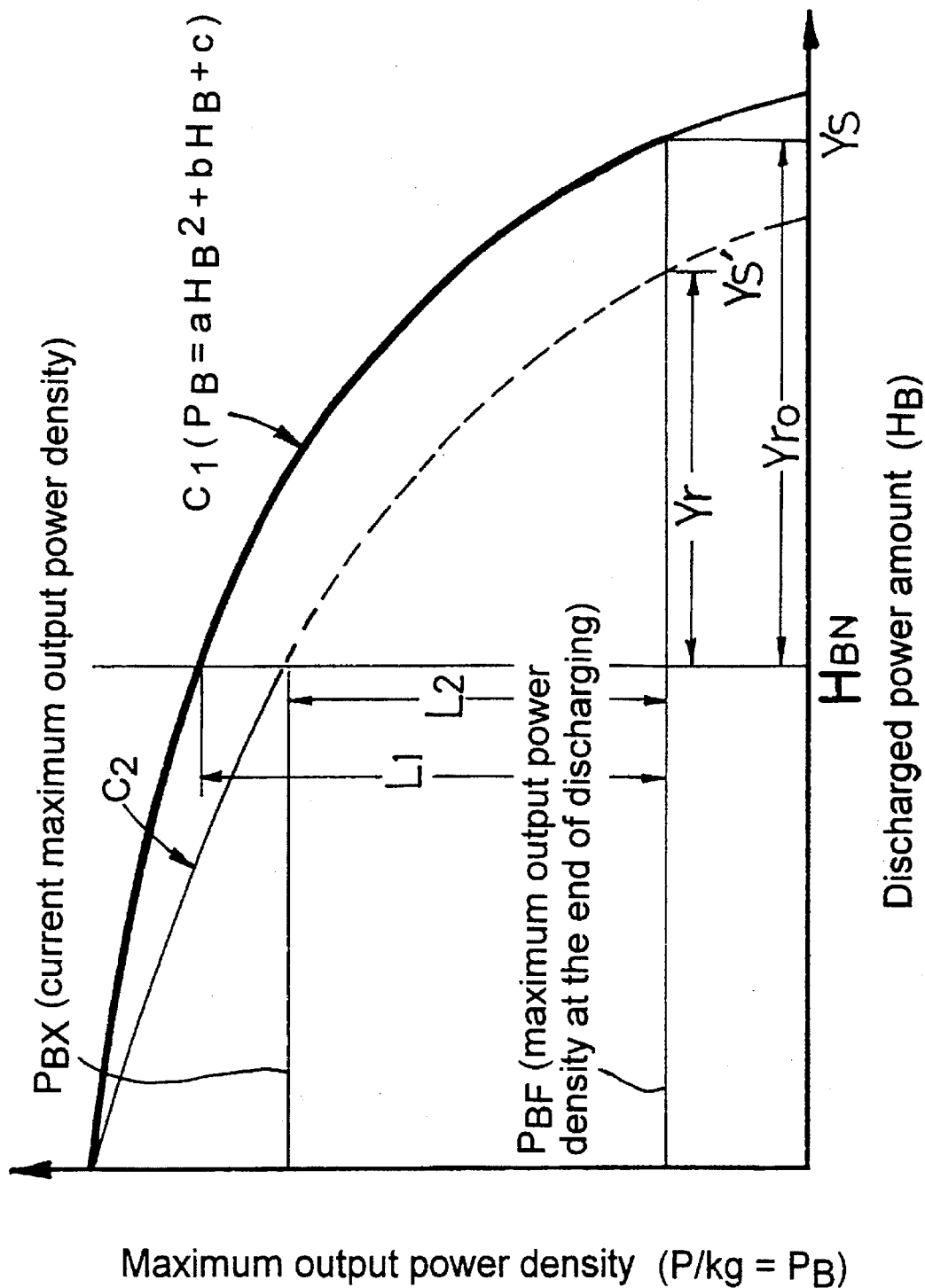

PROCESS FOR DETECTING REMAINING CAPACITY OF BATTERY

This application is a continuation application, of application Ser. No. 08/514,170, filed Aug. 11, 1995, now abandoned which is a FWC of Ser. No. 08/165,232, filed Dec. 10, 1993, now abandoned.

BACKGROUND OF THE INVENTION

1. Field of the Invention

The present invention relates to a process for detecting a remaining capacity of a battery used as an energy source, for example, in an electric vehicle.

2. Description of the Prior Art

There is a conventionally known process for detecting a remaining capacity of a battery, described in Japanese Patent Publication No. 39069/89. In this known process, a maximum output power capable of being taken from the battery is calculated on the basis of a discharged current and a terminal current. Then, using a function representing the relationship between the maximum output power and the battery capacity experimentally and previously determined, a remaining capacity of the battery is calculated from the maximum output power calculated.

However, the relationship between the battery capacity and the maximum capacity capable of being taken from the battery may be varied under influences of the temperature, the discharged State, the discharge rate and the degree of deterioration of the battery and hence, it is difficult to accurately define such relationship by a particular function. Thus, the above process is accompanied by the possibility of an error generated in the remaining capacity calculated.

SUMMARY OF THE INVENTION

Accordingly, it is an object of the present invention to detect the remaining capacity of the battery, irrespective of the conditions of the battery.

To achieve the above object, according to a first aspect and feature of the present invention, there is provided a process for detecting a remaining capacity of a battery, comprising the steps of: calculating a maximum output power and a discharged electric power amount of the battery; and evaluating a future variation in the maximum output power relative to the discharged electric power amount, thereby detecting a remaining capacity of the battery on the basis of the discharged electric power amount until the maximum output power reaches a preset lowest maximum-output power.

With the above feature, it is possible to correctly determine the remaining capacity of the battery with various battery conditions taken into consideration, such as the charged state, the discharge rate and the degree of deterioration of the battery, which are included in the relationship between the discharged electric power amount and the maximum output power. In this case, the remaining capacity is determined on the basis of the lowest maximum-output power regarded as a preset maximum output power at the end of discharging and therefore, when the process according to the present invention is applied to a battery for an electric vehicle, it is possible to insure a minimum speed-increasing performance required for real traveling of the vehicle at the end of discharging.

In addition to the first feature, if the future variation in the maximum output power relative to the discharged electric power amount of the battery is evaluated by a primary or more regression, the relationship between the discharged electric power amount and the maximum output power can be determined with any degree of accuracy, as required.

Further, in addition to the first feature, if the future variation in the maximum output power relative to the discharged electric power amount of the battery is evaluated by comparison of an initial value with an actually measured value, the relationship between the discharged electric power amount and the maximum output power can be determined simply and accurately.

The above and other objects, features and advantages of the invention will become apparent from the following description of preferred embodiments, taken in conjunction with the accompanying drawings.

BRIEF DESCRIPTION OF THE DRAWINGS

FIG. 13 is a graph illustrating the relationship between the discharged electric power amount and the maximum output power density.

DESCRIPTION OF THE PREFERRED EMBODIMENTS

A first embodiment of the present invention will now be described in connection with the accompanying drawings.

Figure 1:
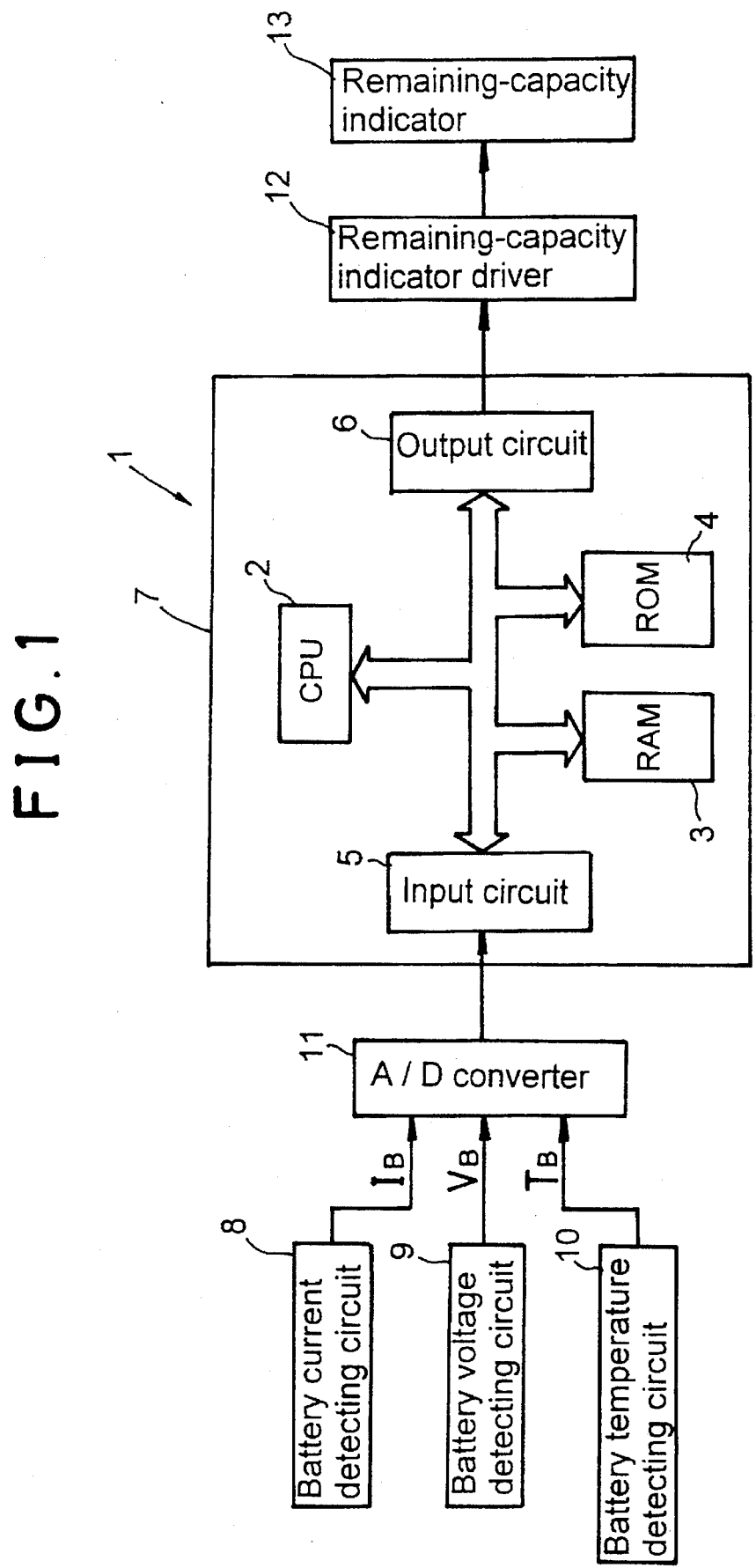
FIG. 1 is a diagram illustrating the entire arrangement of a battery remaining-capacity detecting system.

Referring to FIG. 1, a battery remaining-capacity detecting system 1 for detecting the remaining capacity of a chargeable lead acid battery includes a microcomputer 7 which comprises a central processing unit (CPU) 2, a random access memory (RAM) 3, a read only memory (ROM) 4, an input circuit 5 and an output circuit 6. Connected to the input circuit 5 of the microcomputer 7 through an A/D converter 11 are a battery current detecting circuit 8 for detecting a discharged current $I_B$ from the battery, a battery voltage detecting circuit 9 for detecting a voltage $V_B$ at a terminal of the battery, and a battery temperature detecting circuit 10 for detecting a temperature $T_B$ of the battery. A remaining-capacity indicator 13 is connected to the output circuit 6 of the microcomputer 7 through a remaining-capacity indicator driver 12. The battery temperature detecting circuit 10 is not used in the first embodiment, but is used in a second embodiment which will be described hereinafter.

Figure 2:
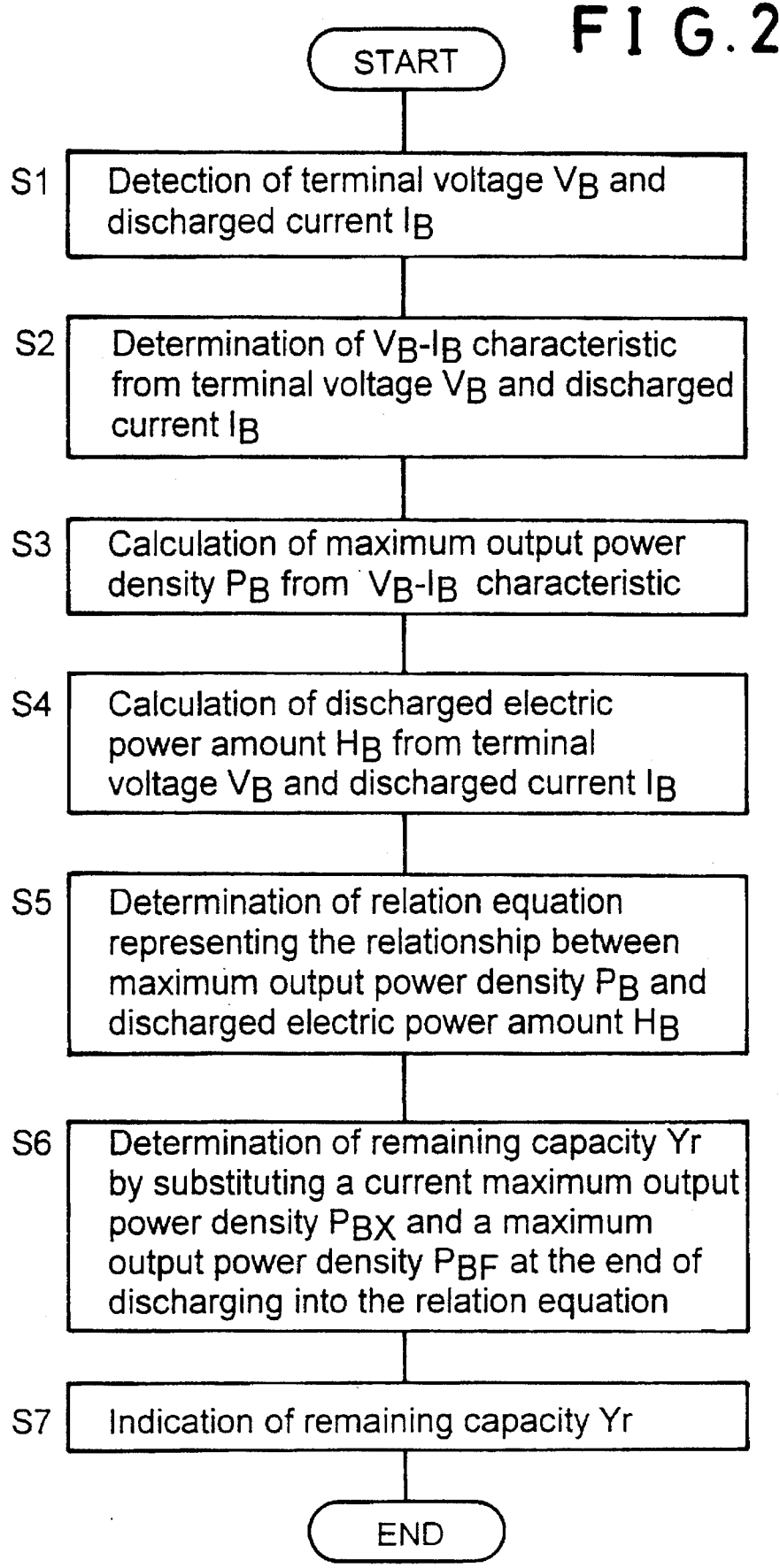
FIG. 2 is a flow chart of a first embodiment.

A procedure for detecting the remaining capacity of the battery will be described below in detail with reference to the flow chart in FIG. 2 and graphs in FIGS. 3 and 4.

First, at a step S1 of the flow chart, the discharged current $I_B$ from the battery detected in the battery current detecting circuit 8 and the voltage $V_B$ at the battery terminal detected in the battery voltage detecting circuit 9 are read by the microcomputer 7. The discharged current $I_B$ and the terminal voltage $V_B$ are continuously detected at a predetermined interval of time during discharging of the battery and sequentially accumulated in the random access memory 3 of the microcomputer 7.

Then, at a step S2, the discharged current $I_B$ and the terminal voltage $V_B$ accumulated in the random access memory 3 are arithmetically processed in the central processing unit 2 on the basis of data such as arithmetic programs and maps previously stored in the read only memory 4, thereby determining a $V_B$-$I_B$ characteristic of the battery.

A procedure for determining the $V_B$-$I_B$ characteristic will be described below.

Figure 3:
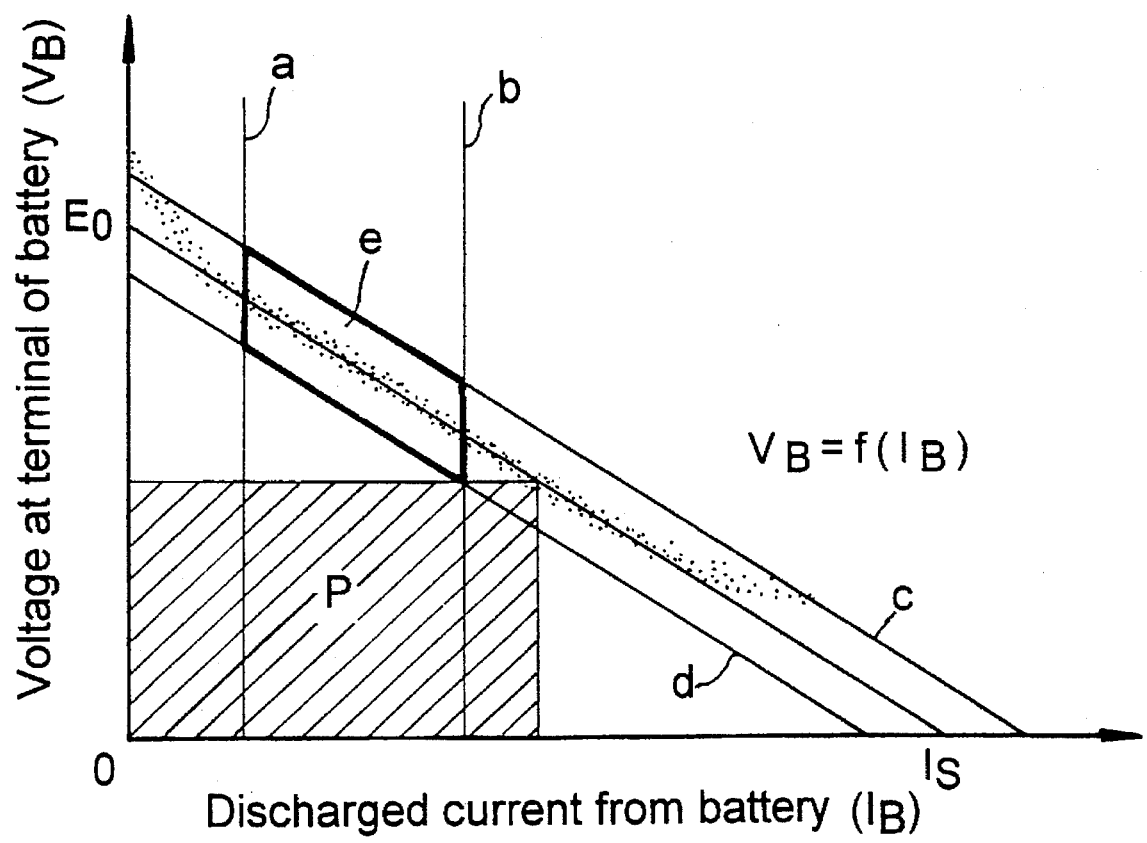
FIG. 3 is a graph illustrating the relationship between the discharged current and the terminal voltage in a high-loading region.

A plurality of points plotted in FIG. 3 indicate the discharged current $I_B$ detected in the battery current detecting circuit 8 and the terminal voltage $V_B$ detected in the battery voltage detecting circuit 9. The $V_B$-$I_B$ characteristic of the battery is such that the terminal voltage $V_B$ is reduced rectilinearly with an increase in discharged current $I_B$. The $V_B$-$I_B$ characteristic is approximated to a straight line represented by the following equation:

$$V_B=f(I_B)=A_1\times I_B+B_1 \quad (1)$$

wherein each of $A_1$ and $B_1$ is an unknown quantity and calculable by a known minimum squaring method. To determine values of $A_1$ and $B_1$, i.e., the straight line represented by $V_B=A_1\times I_B+B_1$, an n-number of detected data ($V_B$, $I_B$) in a region e sandwiched between two straight lines a and b and between two preset straight lines c and d shown in FIG. 3 are sampled, and squared values of longitudinal distances $V_B-f(I_B)$ of each detected data ($V_B$, $I_B$) and a straight line ($V_B=A_1\times I_B+B_1$) to be determined, are added for the n-number of detected data, thereby calculating S by the following equation:

$$S=\Sigma\{V_B-(A_1\times I_B+B_1)\}^2 \quad (2)$$

To ensure that the straight line $V_B=A_1\times I_B+B_1$ is satisfactorily adapted for the n-number of detected data ($V_B$, $I_B$), the following simultaneous equations (3) and (4) in which the equation (2) is equalized to 0 (zero) by partial differentiation by the unknown quantities $A_1$ and $B_1$ may be established:

$$\partial S/\partial A_1=0 \quad (3)$$

$$\partial S/\partial B_1=0 \quad (4)$$

Therefore, an approximate straight line represented by the equation (1) is provided by determining $A_1$ and $B_1$ as answers to the simultaneous equations (3) and (4).

At a next step S3, an intercept $E_0$ of the axis of ordinate of the approximate straight line representing the $V_B$-$I_B$ characteristic in the axis of ordinate at zero $I_b$ and an intercept $I_S$ of the axis of abscissa of the approximate straight line in the axis of abscissa of at zero $V_B$ are calculated, and a maximum output power P (a hatched area shown in FIG. 3) capable of being taken from the battery is calculated according to the following equation:

$$P=(E_0/2)\times(I_S/2) \quad (5)$$

Then, the maximum output power P is derided by the weight of the battery, thereby calculating a maximum output power density $P_B$ which is a maximum output power per unit weight of the battery.

Subsequently, a discharged electric power amount $H_B$ from the battery is calculated at a step S4. The discharged electric power amount $H_B$ is calculated by a product of the terminal voltage $V_B$ and the discharged current $I_B$ at each time point that is integrated by a time t until a current time point according to the following equation:

$$H_B=\int V_B\times I_B dt \quad (6)$$

At a next step S5, the relationship between the maximum output power density $P_B$ and the discharged electric power amount $H_B$ is found. In FIG. 4, each of the black dots indicates an already calculated data, and each of white dots indicates an incalculable data which is to be estimated. The $P_B$-$H_B$ characteristic of the battery forms a parabola in which the decrement of the maximum output power density $P_B$ is small, while the discharged electric power amount $H_B$ is small, and the decrement of the maximum output power density $P_B$ is increased with an increase in discharged electric power amount $H_B$. The $P_B$-$H_B$ characteristic is approximated by a quadratic curve represented by the following equation:

$$H_B=A_2\times P_B^2+B_2\times P_B+C_2 \quad (7)$$

wherein each of $A_2$, $B_2$ and $C_2$ is a unknown quantity.

To determine the unknown quantities $A_2$, $B^2$ and $C_2$, an equation represented by $$H_B'=2A_2\times P_B+B_2 \quad (8)$$

is calculated by primary differentiation of the equation (7) by $P_B$, and further, an equation represented by $$H_B''=2A_2 \quad (9)$$

is calculated by secondary differentiation of the equation (7) by $P_B$.

Figure 4:
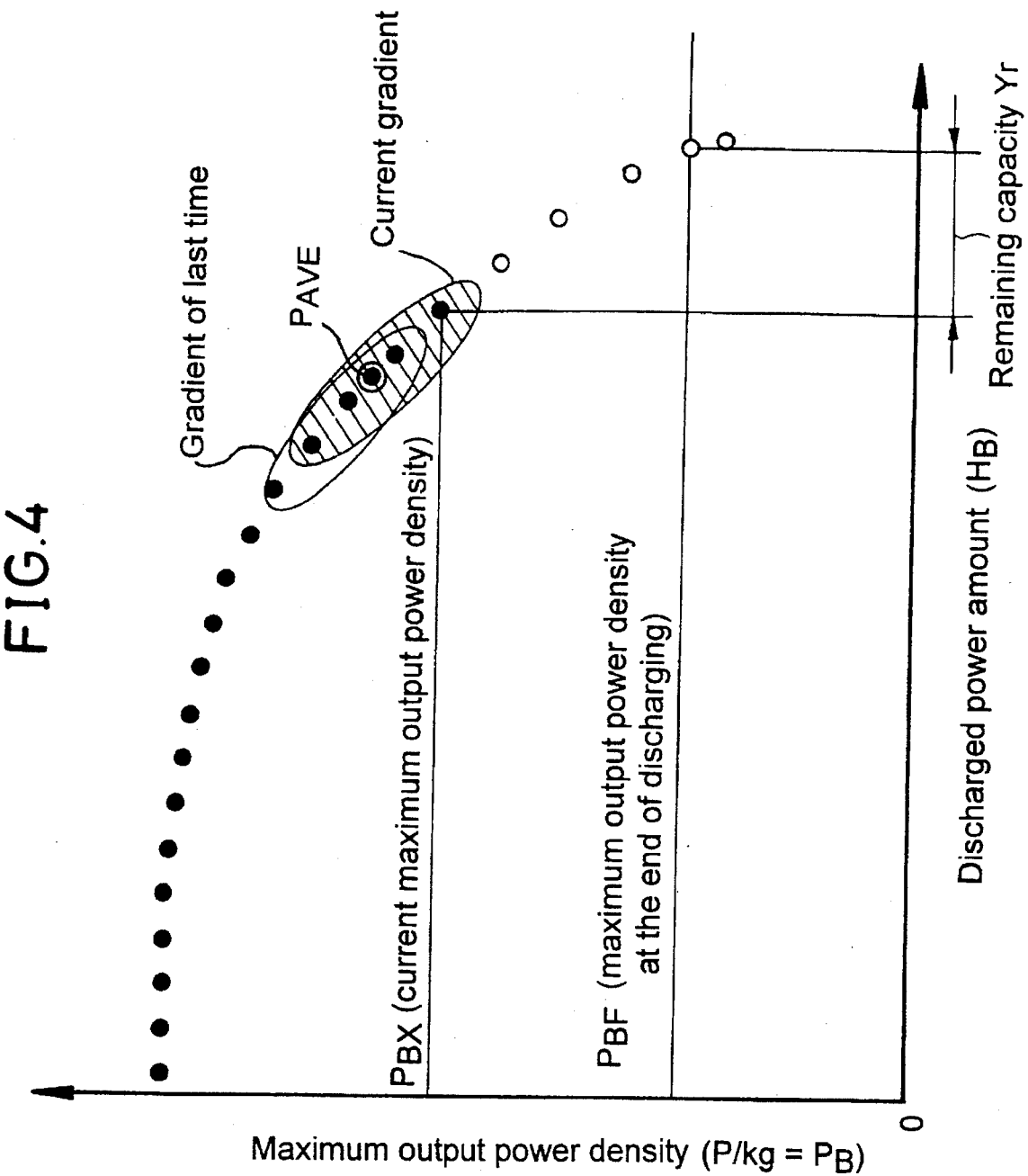
FIG. 4 is a graph illustrating the relationship between the discharged electric power amount and the maximum output power density.

Then, an average value $P_{AVE}$ of maximum output power densities $P_B$ is calculated from n-number of (e.g., four) data continuously calculated in FIG. 4. If a gradient of the curve represented by the equation (7) with respect to this average value $P_{AVE}$ is calculated by a primary regression, the resulting value of such gradient corresponds to $H_B'$ represented by the equation (8). The gradient $H_B'$ of the curve is successively calculated whenever new data ($H_B$, $P_B$) are obtained.

Subsequently, if the gradients of an m-number of values $H_B'$ continuously calculated with respect to the average value $P_{AVE}$ of maximum output power densities $P_B$ are calculated by a primary regression, the resulting value of the gradient corresponds to $H_B''$ represented by the equation (9).

The $H_B'$ and $H_B''$ determined in the above manner are substituted into the equations (8) and (9), thereby providing values represented by the following equations:

$$A_2 = H_B''/2 \tag{10}$$

$$B_2 = H_B' - (H_B'' \times P_{AVE}) \tag{11}$$

Then, a remaining capacity Yr of the battery is determined at a step S6. A maximum output power density $P_B$ at the end of discharging of the battery mounted on an electric vehicle is set as a value at which an accelerating force permitting this vehicle to travel together with another vehicle is provided, i.e., as a lowest maximum-output power density. This value is represented by $P_B = P_{BF}$ in FIG. 4. Therefore, the discharged electric power amount $H_B$ at the end of discharging of the battery is determined by a point at which the above-described curve intersects the straight line represented by $P_B = P_{BF}$, and its value is determined by substituting $P_{BF}$ for $P_B$ in the equation (7), as represented by the following expression:

$$A_2 \times P_{BF}^2 + B_2 \times P_{BF} + C_2 \tag{12}$$

On the other hand, the discharged electric power amount $H_B$ consumed up to the current time is determined by substituting, for $P_B$ in the equation (7), $P_{BX}$ which is a current maximum output power density $P_B$, as represented by the following expression:

$$A_2 \times P_{BX}^2 + B_2 \times P_{BX} + C_2 \tag{13}$$

Therefore, the remaining capacity Yr of the battery is calculated by subtracting the expression (13) from the expression (12), as represented by the following expression:

$$Yr = A_2 \times (P_{BF}^2 - P_{BX}^2) + B_2 \times (P_{BF} - P_{BX}) \tag{14}$$

If the remaining capacity Yr of the battery is evaluated in the above manner, such remaining capacity Yr is indicated at a step S7 on the remaining-capacity indicator 13 through the battery remaining-capacity indicator driver 12.

If the battery conditions such as the temperature, the charged state, the discharge rate, the degree of deterioration and the like are changed, the relationship between the maximum output power density capable of being taken from the battery and the battery discharged current $I_B$ is changed in the form including the changes in the battery conditions and hence, the remaining capacity Yr determined in the above manner is of a high accuracy which is not affected by the battery conditions. In addition, since the maximum output power density $P_B$ capable of being taken from the battery is calculated, it is possible to know a speed-increasing performance itself for the electric vehicle on the basis of such maximum output power density $P_B$.

In evaluating the remaining capacity on the basis of the $P_B$-$H_B$ characteristic of the battery, it is possible to carry out the evaluation of the remaining capacity by a primary regression, when the battery is used in a light cycle charge and discharge mode, but it is desirable for increasing the accuracy that the evaluation of the remaining capacity is carried out by a secondary regression, when the battery is used in a heavy cycle charge and discharge mode.

A second embodiment of the present invention will now be described in connection with the flow chart in FIG. 5, the block diagram in FIG. 6 and graphs in FIGS. 7 to 13.

In the second embodiment, an initial capacity Ys at the turning-ON of a power source switch is first determined. Then, a final remaining capacity Yr is determined by multiplying, by a battery condition factor $K_{SOC}$, a value resulting from the subtraction of the discharged electric power amount $H_B$ from the initial capacity Ys up to a current time, thereby performing a correction. In this case, an output signal from the battery temperature detecting circuit 10 is employed in addition to output signals from the battery current detecting circuit 8 and the battery voltage detecting circuit 9 in FIG. 1.

This will be further described with reference to the flow chart in FIG. 5 and the block diagram in FIG. 6.

Figure 5:
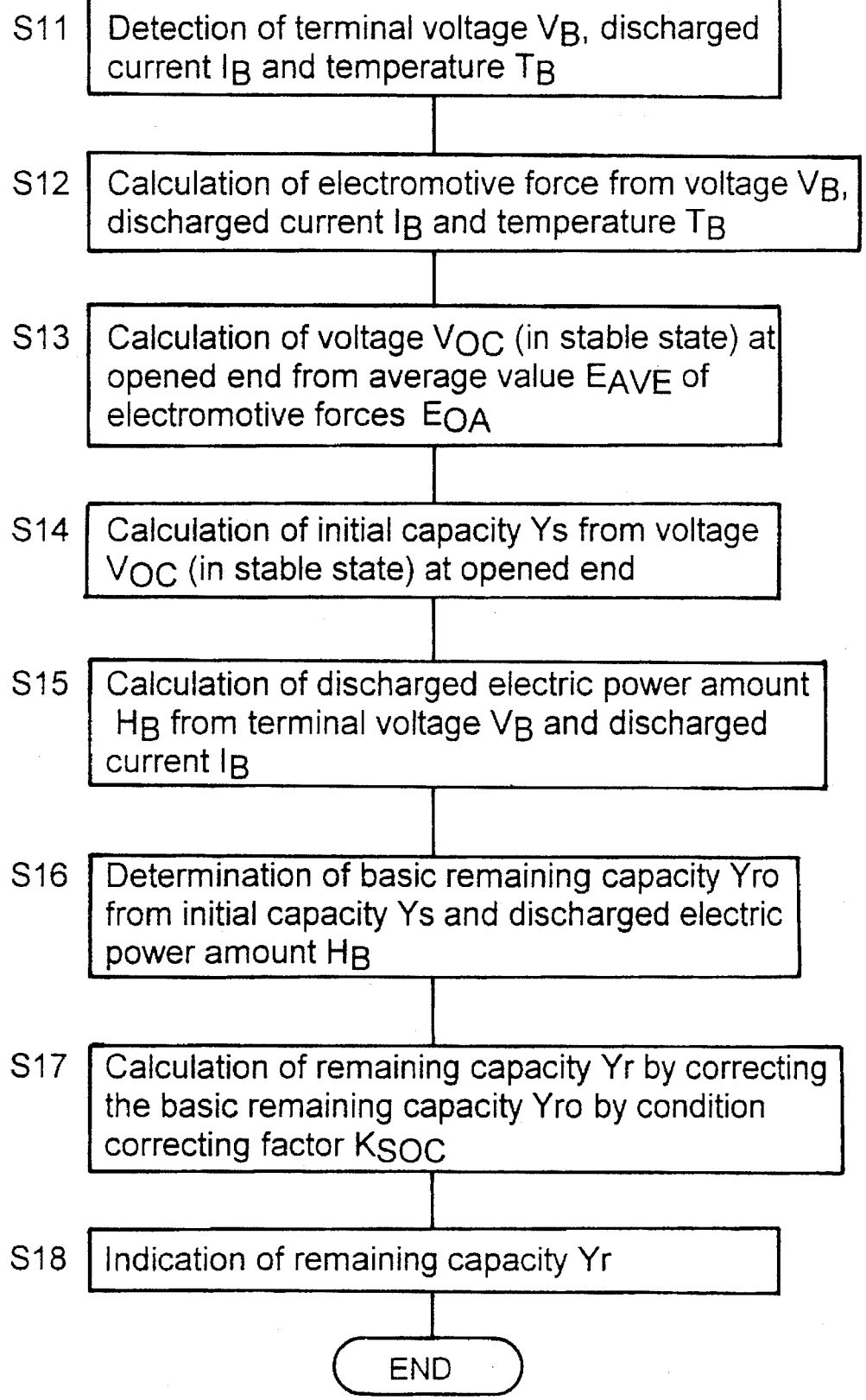
FIG. 5 is a flow chart of a second embodiment.
Figure 6:
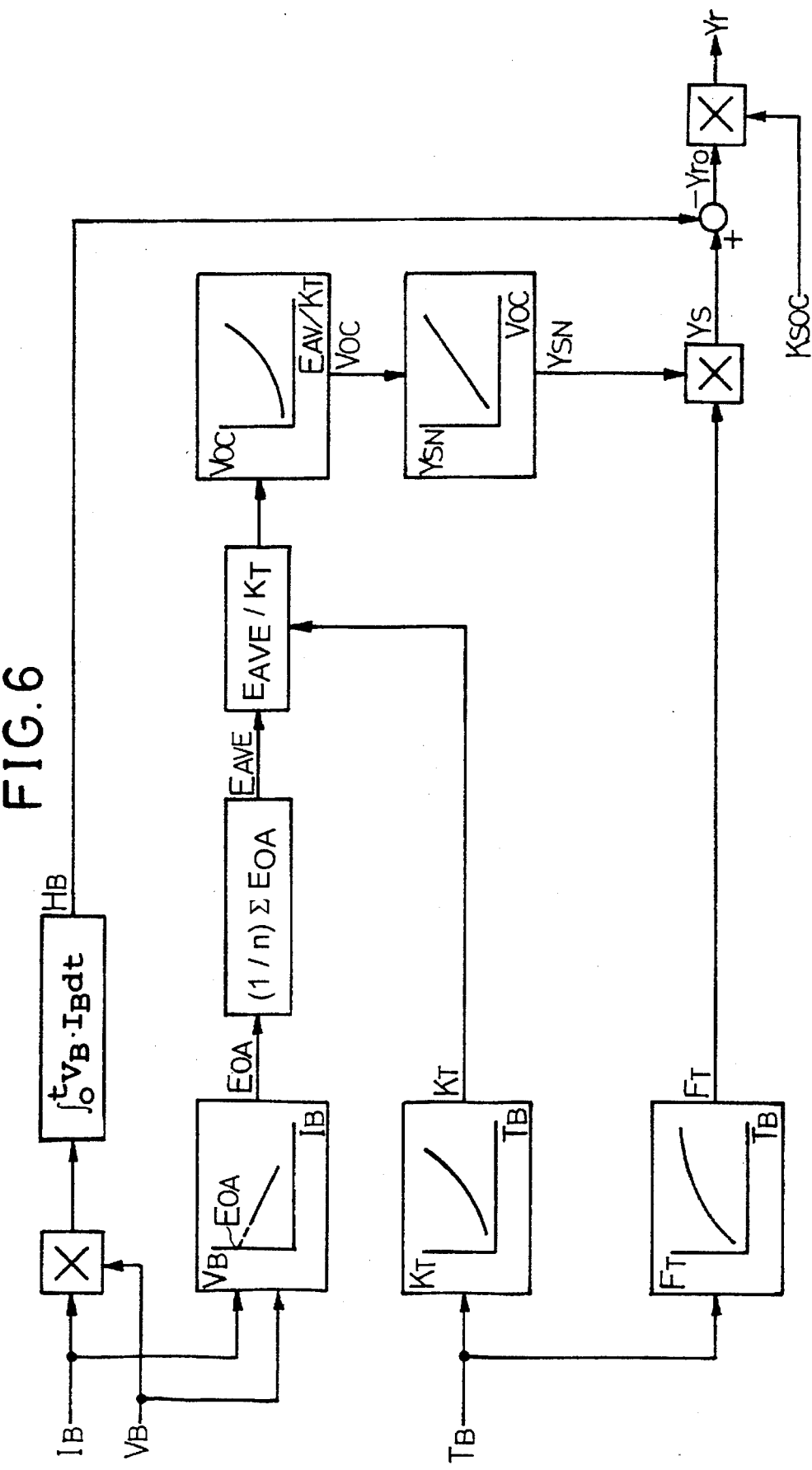
FIG. 6 is a block diagram illustrating a basic algorithm of the second embodiment.
Figure 7:
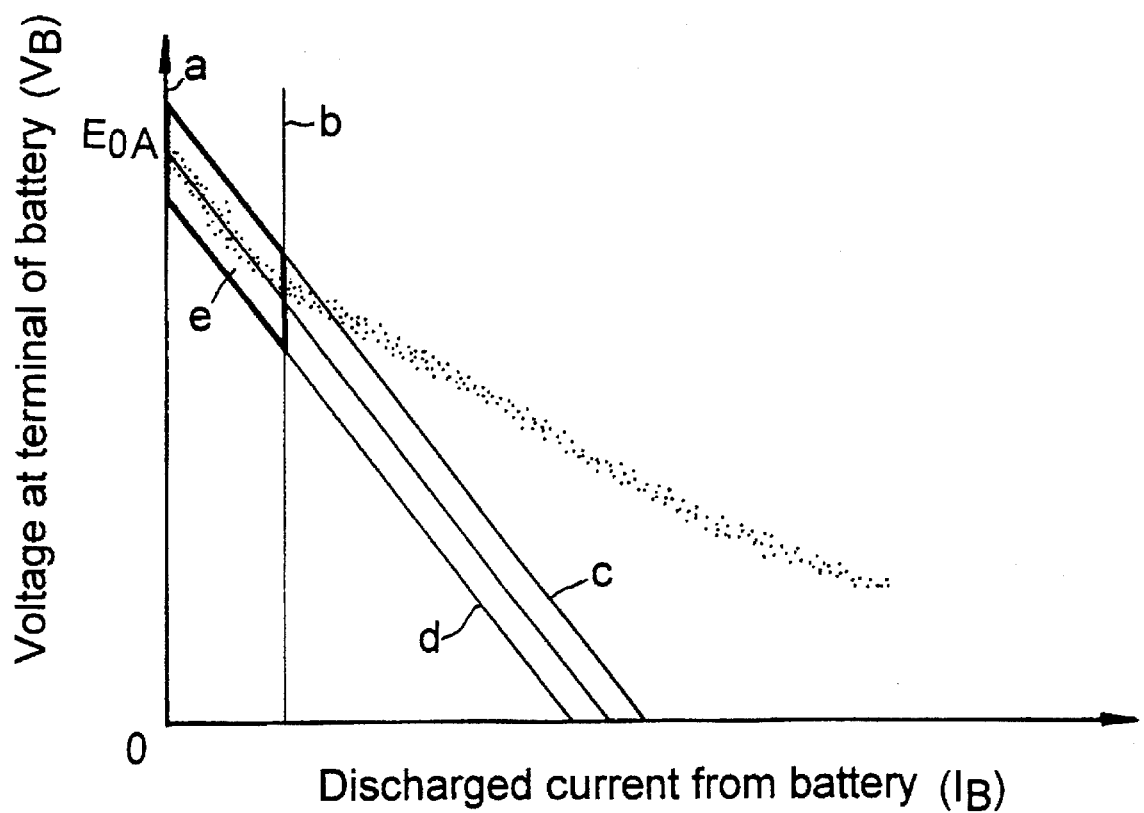
FIG. 7 is a graph illustrating the relationship between the discharged current and the terminal voltage in a low-loading region.
Figure 8:
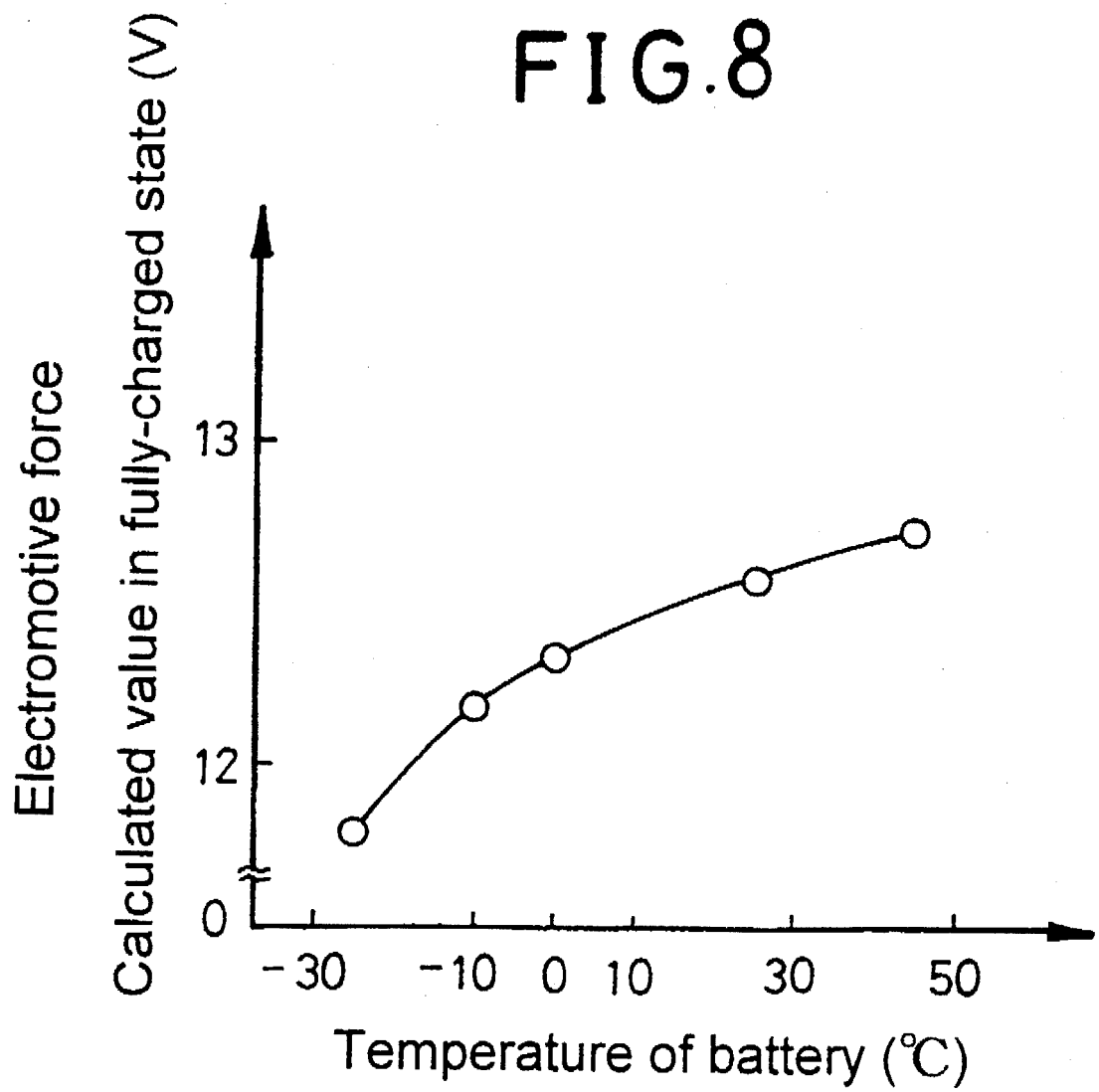
FIG. 8 is a graph illustrating the relationship between the temperature and the electromotive force.
Figure 9:
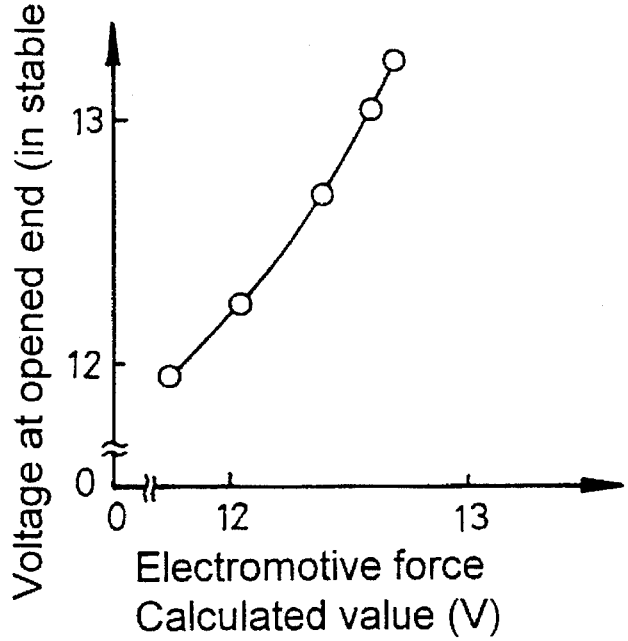
FIG. 9 is a graph illustrating the relationship between the electromotive force and the voltage at an opened end.
Figure 10:
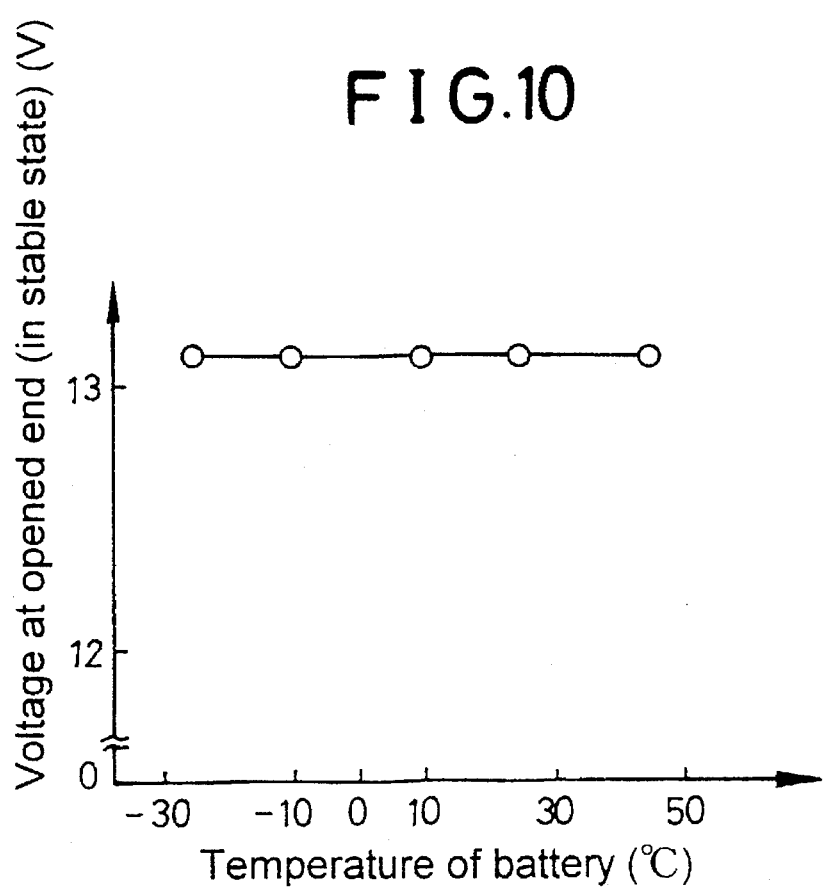
FIG. 10 is a graph illustrating the relationship between the temperature and the voltage at an opened end.
Figure 11:
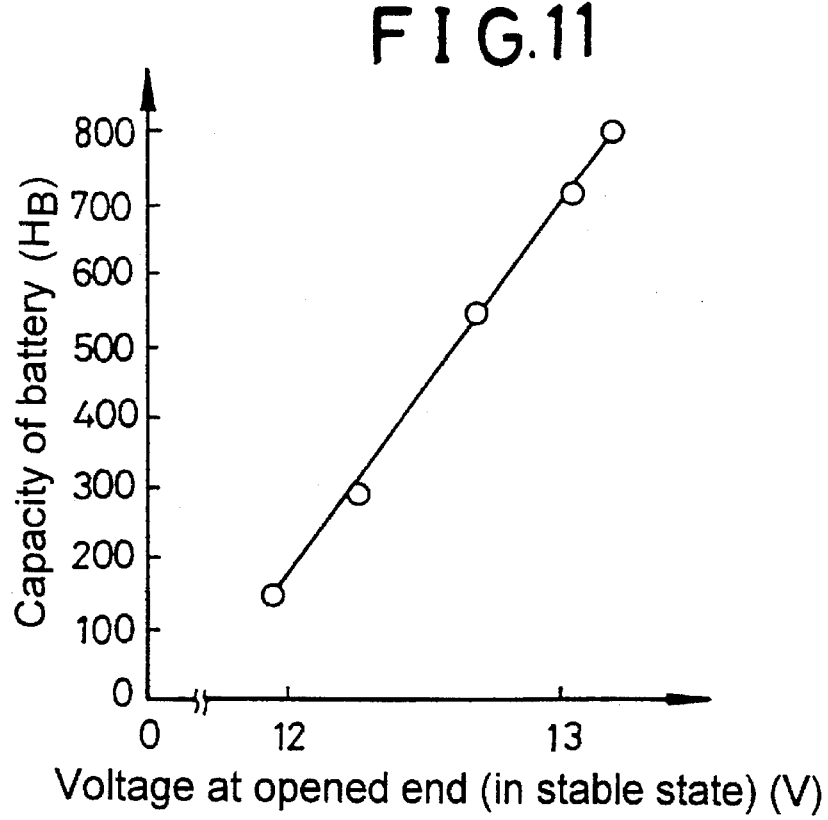
FIG. 11 is a graph illustrating the relationship between the voltage at an opened end and the capacity.
Figure 12:
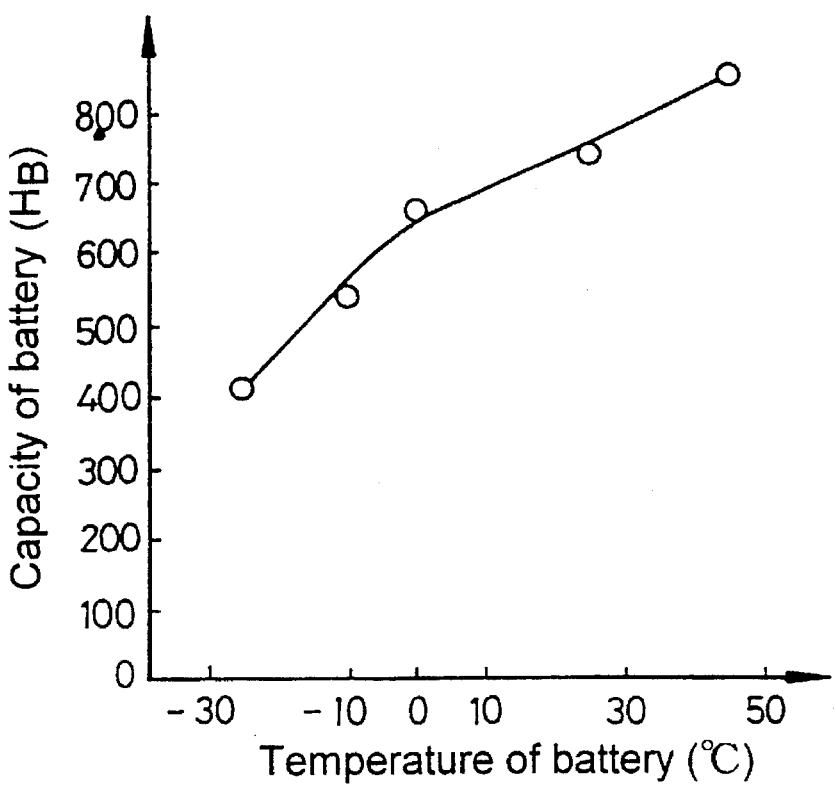
FIG. 12 is a graph illustrating the relationship between the temperature and the capacity.

First, at a step S11 in the flow chart in FIG. 5, three detection data: a battery discharged current $I_B$, a voltage $V_B$ at the terminal of the battery and a temperature $T_B$ of the battery are read. At a next step S12, a calculated electromotive force of the battery is provided. For this purpose, a $V_B$-$I_B$ characteristic of the battery is determined in approximation to a straight line by the same technique as in the previously-described first embodiment, as shown in FIG. 7. In this case, two straight lines a and b defining a region e of detection data ($V_B$, $I_B$) are selected in a region of the small discharged current from the battery, i.e., in a region of low loading of the battery in order to determine a $V_B$-$I_B$ characteristic during low loading of the battery. If an intercept $E_{OA}$ at which the straight line of the $V_B$-$I_B$ characteristic determined by the above-described minimum squaring method intersects the axis of ordinate is calculated, this intercept $E_{OA}$ corresponds to a calculated electromotive force of the battery when the discharged current $I_B$ from the battery is 0 (zero). The calculated electromotive force $E_{OA}$ of the battery is continuously provided multiple times (e.g., 6 times), and an average value $E_{AVE}$ thereof is determined.

If the average value $E_{AVE}$ of the calculated electromotive forces $E_{OA}$ of the battery is provided in the above manner, a voltage $V_{OC}$ at an opened end of the battery (in the stable state) is calculated at a next step S13. More specifically, in order to correct the calculated average electromotive force value $E_{AVE}$ to an average electromotive force value $E_{AVE}$ at 25° C., the calculated average electromotive force value $E_{AVE}$ is first applied to the graph in FIG. 8 stored as a map in the read only memory 4 and is corrected to the value obtained at 25° C. This correction is shown as a correction based on a regulated temperature factor $K_T$ in FIG. 6. Then, on the basis of the graph in FIG. 9 stored as the map, a voltage $V_{OC}$ at the opened end of the battery (in the stable state) is determined in correspondence to the average electromotive force value $E_{AVE}$ corresponding to that at 25° C. At this time, it is confirmed that the voltage $V_{OC}$ at the opened end of the battery (in the stable state) is little affected by the temperature, as apparent from a graph in FIG. 10.

At a next step S14, a battery capacity $Y_{SN}$ corresponding to that at 25° C. is first calculated. More specifically, a battery capacity $Y_{SN}$ corresponding to the current voltage $V_{OC}$ at the opened end of the battery (in the stable state) determined at the step S13 is determined from a graph in FIG. 11. Then, a capacity of the battery when full-charged, which corresponds to the temperature $T_S$ of the battery, has previously been provided in a graph in FIG. 12, and an initial battery capacity Ys at a current temperature is calculated by correcting the battery capacity $Y_{SN}$ determined in the FIG. 11 on the basis of this graph. This correction is shown as a correction based on a battery capacity temperature factor $F_T$ in the block diagram in FIG. 6.

At a step S15, a discharged electric power amount $H_B$ from the battery is calculated by integrating the product of the terminal voltage $V_B$ and the discharged current $I_B$ at each time point by the time t according to the above-described equation (6).

At a step S16, a basic remaining capacity $Yr_0$ is calculated by subtracting the discharged electric power amount $H_B$ from the initial battery capacity Ys.

Then, at a step S17, a remaining battery capacity Yr is finally calculated by correcting the basic remaining capacity $Yr_0$ by a battery condition correcting factor $K_{SOC}$.

The basic remaining capacity $Yr_0$ determined at the step S16 corresponds to a remaining capacity at the start of discharging, when it is assumed that the non-deteriorated battery has been charged in an FUDS (Federal Urban Driving Schedule) mode. However, in fact, there are differences in deterioration and discharge rate between the batteries and hence, it is necessary to correct the basis remaining capacity $Yr_0$ by the battery condition correcting factor $K_{SOC}$. A procedure for calculating the battery condition correcting factor $K_{SOC}$ will be described below.

A basic characteristic $C_1$ as an initial value shown by a thick solid line in FIG. 13 indicates the relationship of the maximum output power density $P_B$ relative to the discharged electric power amount $H_B$, when a new battery fully charged at 25° C. has been discharged in the FUDS mode. This basic characteristic $C_1$ can previously be known by an experiment. On the other hand, an actually measured characteristic $C_2$ shown by a thin solid line and a dashed line in FIG. 13 indicates a real discharge characteristic from the same battery. The solid line corresponds to a known portion actually detected, and the dashed line corresponds to a unknown portion. The known portion of the really measured characteristic $C_2$ is determined on a $H_B$-$P_B$ plane in the same manner as in the first embodiment, i.e., by determining the maximum output power density $P_B$ according to the equation (5) and by calculating the discharged electric power amount $H_B$ according to the equation (6).

As apparent from FIG. 13, the basic remaining-capacity $Yr_0$ determined at the step S16 corresponds to a value obtained by subtracting the current discharged electric power amount $H_{BN}$ from the initial capacity Ys of the basic characteristic $C_1$. On the other hand, the real remaining-capacity Yr is provided by a difference between the current discharged electric power amount $H_{BN}$ and the discharged electric power amount Ys' at a point at which the curve of the actually measured characteristic $C_2$ intersects the straight line $P_B=P_{BF}$. However, the real remaining-capacity Yr cannot be determined directly, because the portion of the actually measured characteristic $C_2$ indicated by the dashed line is unknown. Thereupon, by taking into consideration the fact that the known basic characteristic $C_1$ and the unknown really-measured characteristic $C_2$ (i.e., the portion indicated by the dashed line) are substantially analogous to each other, the real remaining-capacity Yr can be determined indirectly by multiplying the basic remaining-capacity $Yr_0$ by a predetermined rate (i.e., the battery condition correcting factor $K_{SOC}$).

More specifically, in the case of the straight line of the current discharged electric power amount $H_B=H_{BN}$, $L_2/L_1$ which is a ratio of the distances $L_1$ and $L_2$ on such straight line is substantially equal to a ratio $Yr/Yr_0$ of the real remaining-capacity Yr to the basic remaining-capacity $Yr_0$. This permits the following equation to be established:

$$Yr/Yr_0 = L_2/L_1 = K_{SOC} \qquad (15)$$

Namely, if the battery condition correcting factor $K_{SOC}$ is determined by the ratio $L_2/L_1$, the real remaining-capacity Yr can be determined by multiplying the known basic remaining-capacity $Yr_0$ by the battery condition correcting factor $K_{SOC}$.

For this purpose, the basic characteristic $C_1$ has been provided as the following function on the $H_B$-$P_B$ plane:

$$P_B = f(H_B) = aH_B^2 + bH_B + c \qquad (16)$$

wherein each of a, b and c is a constant.

Therefore, the current maximum output power density $P_B$ in the basic characteristic $C_1$ is provided according to $P_B = f(H_{BN}) = aH_{BN}^2 + bH_{BN} + c$, and the above-described distance $L_1$ is provided by subtracting, from this value, the maximum output power density $P_{BN}$ according to the following equation:

$$L_1 = (aH_{BN}^2 + bH_{BN} + c) - (P_{BF} - \alpha) \qquad (17)$$

wherein $\alpha$ is a correcting term.

On the other hand, the distance $L_2$ in the really measured characteristic $C_2$ is provided by subtracting a maximum output power density $P_{BF}$ at the end of discharging from a current maximum output power density $P_{BX}$, as represented by the following equation:

$$L_2 = P_{BX} - (P_{BF} - \alpha) \qquad (18)$$

wherein $\alpha$ is a correcting term.

The battery condition correcting factor $K_{SOC}$ is determined according to the equation (15) from the distances $L_1$ and $L_2$ calculated according to the equations (17) and (18), and the basic remaining-capacity $Yr_0$ is multiplied by this battery condition correcting factor $K_{SOC}$, thereby determining a real remaining-capacity Yr.

As described above, by taking into consideration the fact that the maximum output power density $P_B$ of the battery is varied in a secondary curve with respect to the discharged electric power amount $H_B$, the electric power amount $H_B$ discharged until the maximum output power density $P_{BF}$ at the end of discharging is reached, is preestimated by the degree of such variation to determine the battery condition correcting factor $K_{SOC}$. Therefore, it is possible to correctly determine the remaining capacity of the battery in a condition in which an influence exerted on the battery capacity by the discharge rate and an influence exerted on the battery capacity by the deterioration of the battery have been taken into consideration.

Although the embodiments of the present invention have been described above, it will be understood that the present invention is not limited to these embodiments, and various modifications and variations in design can be made without departing from the spirit and scope of the invention defined in claims.

What is claimed is:

1. A process for detecting a remaining capacity of a battery after a period of time of discharging use of the battery, comprising the steps of:

measuring values of discharging current and voltage over the period of time;

determining a discharging current-voltage relationship characteristic of the battery based on a relationship between said measured discharge current and voltage over a range of discharging currents and voltages;

calculating maximum output power densities of the battery based on said determined relationship characteristic over the period of time;

calculating discharged electric power amounts of the battery based on values of said measured discharge current and voltage over the period of time;

determining a relationship between said maximum output power densities and said discharged electric power amounts over the period of time;

determining a maximum discharged electric power amount at a preset lowest maximum output power density based on said determined relationship between maximum output power densities and discharged electric power amounts of the battery;

determining the difference between said determined maximum discharged electric power amount and a present value of said calculated discharged electric power amount;

detecting said determined difference as a present remaining capacity of the battery; and driving a battery system monitoring means in response to said detected remaining capacity of the battery.

2. A process for detecting the remaining capacity of a battery according to claim 1, wherein the predetermined relationship between the maximum output power density and the discharged electric power amount of the battery is determined by at least a primary regression.

3. A process for detecting the remaining capacity of a battery according to claim 1, wherein the predetermined relationship between the maximum output power density and the discharged electric power amount of the battery is determined by a comparison of an initial value of maximum output power density with an actually measured value of maximum output power density.

4. A process for detecting the remaining capacity of a battery according to claim 1, wherein a battery condition correcting factor is calculated based on predetermined assumed values of maximum output power density and discharged electric power amount in comparison with current said calculated values of maximum output power density and discharged electric power amount.

5. A process for detecting the remaining capacity of a battery according to claim 1, wherein a battery condition correcting factor is calculated based on predetermined assumed values of maximum output power density and discharged electric power mount in comparison with current said calculated values of maximum output power density and discharged electric power amount.

6. A process for detecting the remaining capacity of a battery according to claim 1, wherein the step of calculating said maximum output power density includes a step of dividing by a weight of the battery for producing said maximum output power density density value.

7. A process for detecting the remaining capacity of a battery according to claim 1, wherein the determined relationship characteristic of the battery is a linear relationship between discharge current and voltage approximated from a plurality of measurements of said discharging currents and voltage during a plurality of discharges of the battery.

8. A process for detecting the remaining capacity of a battery according to claim 1, wherein said range is a predetermined range of discharging currents between maximum and minimum discharging currents.

9. A process for detecting the remaining capacity of a battery according to claim 1, wherein said range is a predetermined range of discharging currents from zero to an intermediate discharging current substantially below a maximum discharging current.

10. A process for detecting the remaining capacity of a battery according to claim 1, wherein a correction factor based on said calculated maximum output power densities and discharged electric power amounts during the period of time is used for modifying values of said predetermined relationship for determining the maximum discharged electric power amount.

11. A process for detecting the remaining capacity of a battery according to claim 1, wherein the step of calculating said maximum output power densities includes multiplying one-half of the maximum discharge current at a minimum voltage in said determined relationship characteristic by one-half of the maximum value of the maximum voltage at a minimum discharge current in said determined relationship characteristic.

12. A process for detecting a remaining capacity of a battery after a period of time of discharging use of the battery, comprising the steps of:

measuring values of discharging current and voltage over the period of time;

determining a discharging current-voltage relationship characteristic of the battery based on a relationship between said measured discharge current and voltage over a range of discharging currents and voltages;

calculating maximum output power densities of the battery based on said determined relationship characteristic over the period of time;

calculating discharged electric power amounts of the battery based on values of said measured discharge current and voltage over the period of time;

determining a relationship between said maximum output power densities and discharged electric power amounts over the period of time;

determining a maximum discharged electric power amount at a lowest effective a maximum output power density based on said determined relationship between maximum output power densities and discharged electric power amounts of the battery;

determining the difference between said determined maximum discharged electric power amount and a present discharged electric power amount and detecting said determined difference as the remaining capacity of the battery; and driving an indicator to indicate said determined difference as a present remaining capacity of the battery.

13. A process for detecting the remaining capacity of a battery according to claim 12, wherein the determined relationship between the maximum output power density and the discharged electric power of the battery is determined by at least a primary regression.

14. A process for detecting the remaining capacity of a battery according to claim 12, wherein the determined relationship between the maximum output power density and the discharged electric power of the battery is determined by a comparison of an initial value of maximum output power density with an actually measured value of maximum output power density.

15. A process for detecting the remaining capacity of a battery according to claim 12, wherein a battery condition correcting factor is calculated based on predetermined assumed values of maximum output power density and discharged electric power in comparison with current said calculated values of maximum output power density and discharged electric power.

16. A process for detecting the remaining capacity of a battery according to claim 12, wherein a battery condition correcting factor is calculated based on predetermined assumed values of maximum output power density and discharged electric power amount in comparison with current said calculated values of maximum output power density and discharged electric power amount.

17. A process for detecting a remaining capacity of a battery after a period of time of discharging use of the battery, comprising the steps of:

measuring values of discharging current and voltage over the period of time;

determining a discharging current-voltage relationship characteristic of the battery based on a relationship between said measured discharge current and voltage over a range of discharging currents and voltages;

calculating maximum output power values of the battery based on said determined relationship characteristic over the period of time;

calculating discharged electric power amounts of the battery based on values of said measured discharge current and voltage over the period of time;

determining a relationship between said maximum output power values and said discharged electric power amounts over the period of time;

determining a maximum discharged electric power amount at a preset lowest maximum output power density based on said determined relationship between maximum output power values and discharged electric power amounts of the battery;

determining the difference between said determined maximum discharged electric power amount and a present value of said calculated discharged electric power amount; and detecting said determined difference as a present remaining capacity of the battery after the period of time; and driving a remaining-capacity indicator in response to said determined difference for indicating a present remaining capacity of the battery on said remaining-capacity indicator.

* * * * *